United States Patent
Wang et al.

(10) Patent No.: US 11,320,326 B2
(45) Date of Patent: May 3, 2022

(54) FORCE SENSOR AND SENSING ELEMENT THEREOF

(71) Applicant: NATIONAL SUN YAT-SEN UNIVERSITY, Kaohsiung (TW)

(72) Inventors: Yu-Jen Wang, Kaohsiung (TW); Li-Chi Wu, Kaohsiung (TW)

(73) Assignee: National Sun Yat-Sen University, Kaohsiung (TW)

( * ) Notice: Subject to any disclaimer, the term of this patent is extended or adjusted under 35 U.S.C. 154(b) by 170 days.

(21) Appl. No.: 16/986,501

(22) Filed: Aug. 6, 2020

(65) Prior Publication Data

US 2021/0041312 A1 Feb. 11, 2021

(30) Foreign Application Priority Data

Aug. 9, 2019 (TW) .......................... TW108128430

(51) Int. Cl.
*G01L 1/22* (2006.01)
*G01L 1/20* (2006.01)

(52) U.S. Cl.
CPC .............. *G01L 1/22* (2013.01); *G01L 1/205* (2013.01)

(58) Field of Classification Search
CPC ................................. G01L 1/22; G01L 1/205
See application file for complete search history.

(56) References Cited

U.S. PATENT DOCUMENTS

| | | | |
|---|---|---|---|
| 4,143,727 A * | 3/1979 | Jacobson | G01G 3/1404 73/862.633 |
| 5,101,669 A * | 4/1992 | Holm-Kennedy | G01P 15/0802 361/278 |
| 5,336,854 A * | 8/1994 | Johnson | G01G 3/1412 177/229 |
| 5,756,943 A * | 5/1998 | Naito | G01L 1/2243 177/229 |
| 6,363,798 B1 * | 4/2002 | Gitis | G01L 1/2243 73/862.633 |
| 2006/0070463 A1 * | 4/2006 | Walker | G01L 1/2243 73/862.627 |

(Continued)

FOREIGN PATENT DOCUMENTS

| | | |
|---|---|---|
| CN | 101111751 A | 1/2008 |
| CN | 105758560 A | 7/2016 |

(Continued)

OTHER PUBLICATIONS

Taiwanese Office Action dated Mar. 5, 2020 for Taiwanese Patent Application No. 108128430, 3 pages.

*Primary Examiner* — Max H Noori
(74) *Attorney, Agent, or Firm* — Demian K. Jackson; Jackson IPG PLLC

(57) ABSTRACT

A force sensor includes a sensing element, a forced element and strain gauges. There are flexure mechanisms on the sensing element, the forced element is coupled to a free end of each of the flexure mechanisms, and each of the strain gauges is placed on an elastic portion of each of the flexure mechanisms respectively. Each of the strain gauges is provided to detect an elastic strain of the elastic portion when a forced is applied to the forced element, transmitted to the free end via the forced element and transmitted to the elastic portion via a flexure hinge of each of the flexure mechanisms.

20 Claims, 5 Drawing Sheets

(56) References Cited

U.S. PATENT DOCUMENTS

| | | | | |
|---|---|---|---|---|
| 2006/0138904 A1* | 6/2006 | Chu | ............. | H02N 2/028 |
| | | | | 310/328 |
| 2010/0268121 A1* | 10/2010 | Kilborn | ............. | A61B 5/412 |
| | | | | 600/587 |
| 2015/0282762 A1* | 10/2015 | Lechot | ............. | A61B 5/6833 |
| | | | | 600/300 |
| 2017/0164831 A1* | 6/2017 | Choo | ............. | A61B 3/0008 |
| 2017/0191889 A1* | 7/2017 | Meyer | ............. | G01L 1/2206 |
| 2017/0305301 A1* | 10/2017 | McMillen | ............. | B60N 2/002 |
| 2021/0041312 A1* | 2/2021 | Wang | ............. | G01L 1/205 |
| 2022/0011150 A1* | 1/2022 | Trakhimovich | ....... | G01G 3/141 |
| 2022/0021262 A1* | 1/2022 | Morita | ............. | H02K 3/26 |
| 2022/0032516 A1* | 2/2022 | Hirano | ............. | B29C 45/14467 |
| 2022/0057835 A1* | 2/2022 | Feng | ............. | G06F 1/1652 |
| 2022/0068998 A1* | 3/2022 | Luo | ............. | H01L 27/156 |

FOREIGN PATENT DOCUMENTS

| | | |
|---|---|---|
| CN | 107167267 A | 9/2017 |
| JP | 2019-522186 A | 8/2019 |
| TW | 201910738 A | 3/2019 |

\* cited by examiner

FORCE SENSOR AND SENSING ELEMENT THEREOF

FIELD OF THE INVENTION

This invention generally relates to a force sensor, and more particularly to a force sensor that includes flexure mechanisms for improving sensitivity.

BACKGROUND OF THE INVENTION

Force sensors are indispensable mechanisms widely used in mechanical engineering. For instance, force sensors can feedback the detected force variation to actuators so as to control manipulators precisely. There are capacitive, piezo-electric, optic and strain-type force sensors, particularly, strain-type force sensors have advantages of high precision, high sensitivity and low cost.

In the conventional strain-type force sensor, elastic beam is deformed when external force is applied to the sensor, and strain gauge mounted on the elastic beam is deformed with the elastic beam and converts the force into a change in electrical resistance such that the sensor can measure the applied force according to electrical resistance variation. Under the restriction of the deformation direction of the elastic beam, the strain gauge has to be stuck on the lateral side of the elastic beam. However, it is difficult to precisely stick the strain gauge on the designate position on the lateral side of the elastic beam so the sensitivity of the conventional strain-type force sensor is insufficient for current requirements.

SUMMARY

The object of the present invention is to provide a force sensor that can transform force into single axis force by using flexure mechanisms so as to enhance sensitivity of strain gauge.

One aspect of the present invention provides a force sensor including a sensing element, a forced element and strain gauges. The sensing element includes a body and flexure mechanisms that are located in accommodation spaces of the body and exposed by openings of the accommodation spaces, respectively. Each of the flexure mechanisms includes a first flexure hinge, a second flexure hinge, a first block, a second block and a third block. The body is connected to a first lateral surface of the third block via the first flexure hinge. The first block includes a fixed end, a first connection end and an elastic portion, the fixed end is connected to the body, the first connection end is connected to a second lateral surface of the third block via the second flexure hinge, and both ends of the elastic portion are connected to the fixed end and the first connection end respectively. The second block includes a free end and a second connection end, the second connection end is connected to the second lateral surface of the third block such that the free end is suspended in the accommodation space. The forced element is placed on the sensing element and coupled to the free end of the second block. Each of the strain gauges is placed on the elastic portion of each of the flexure mechanisms and configured to sense an elastic strain of the elastic portion when a force is applied to the forced element, transmitted to the free end via the forced element and transmitted to the elastic portion via the first and second flexure hinges.

Another aspect of the present invention provides a sensing element of force sensor that includes a body and flexure mechanisms. The flexure mechanisms are located in accommodation spaces of the body and exposed by openings of the accommodation spaces, respectively. Each of the flexure mechanisms includes a first flexure hinge, a second flexure hinge, a first block, a second block and a third block. The body is connected to a first lateral surface of the third block via the first flexure hinge. The first block includes a fixed end, a first connection end and an elastic portion, the fixed end is connected to the body, the first connection end is connected to a second lateral surface of the third block via the second flexure hinge, and both ends of the elastic portion are connected to the fixed end and the first connection end respectively. The second block includes a free end and a second connection end, the second connection end is connected to the second lateral surface of the third block such that the free end is suspended in the accommodation space.

The force transmitted to the elastic portion is converted into a single axis force by the first and second flexure hinges that are used as rotary joints. Consequently, the elastic strain of the elastic portion caused by the single axis force enables the strain gauge on the elastic portion to have higher sensitivity.

DETAILED DESCRIPTION OF THE INVENTION

Figure 1:
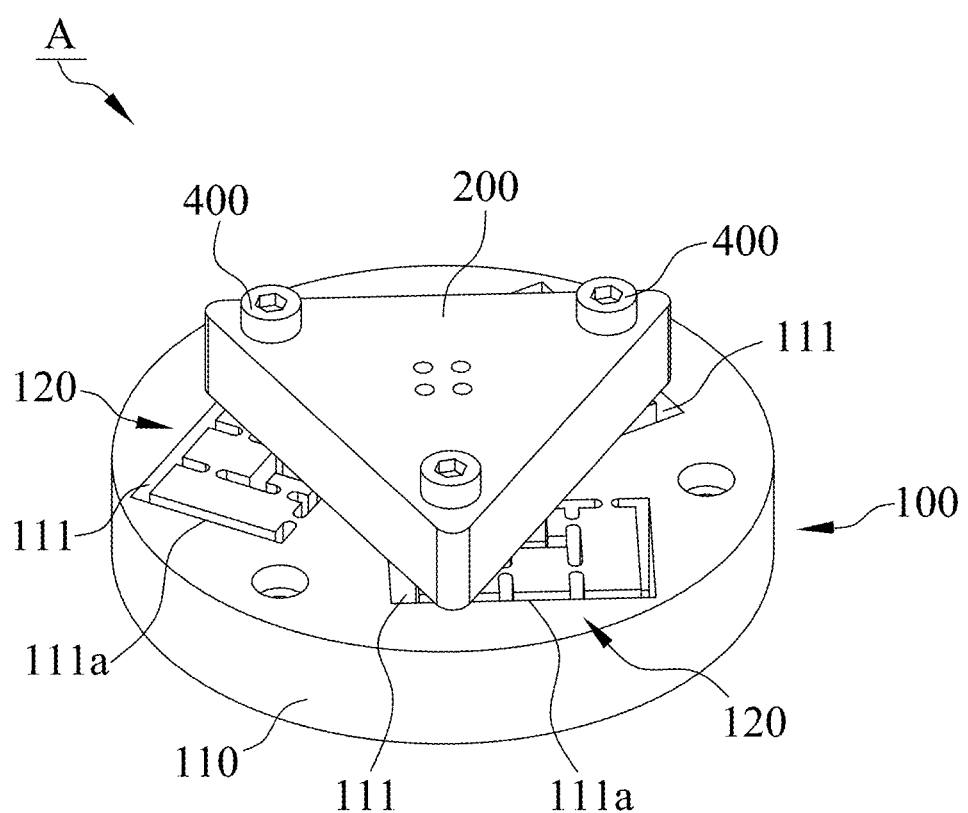
FIG. 1 is a perspective assembly diagram illustrating a force sensor in accordance with a preferred embodiment of the present invention.
Figure 2:
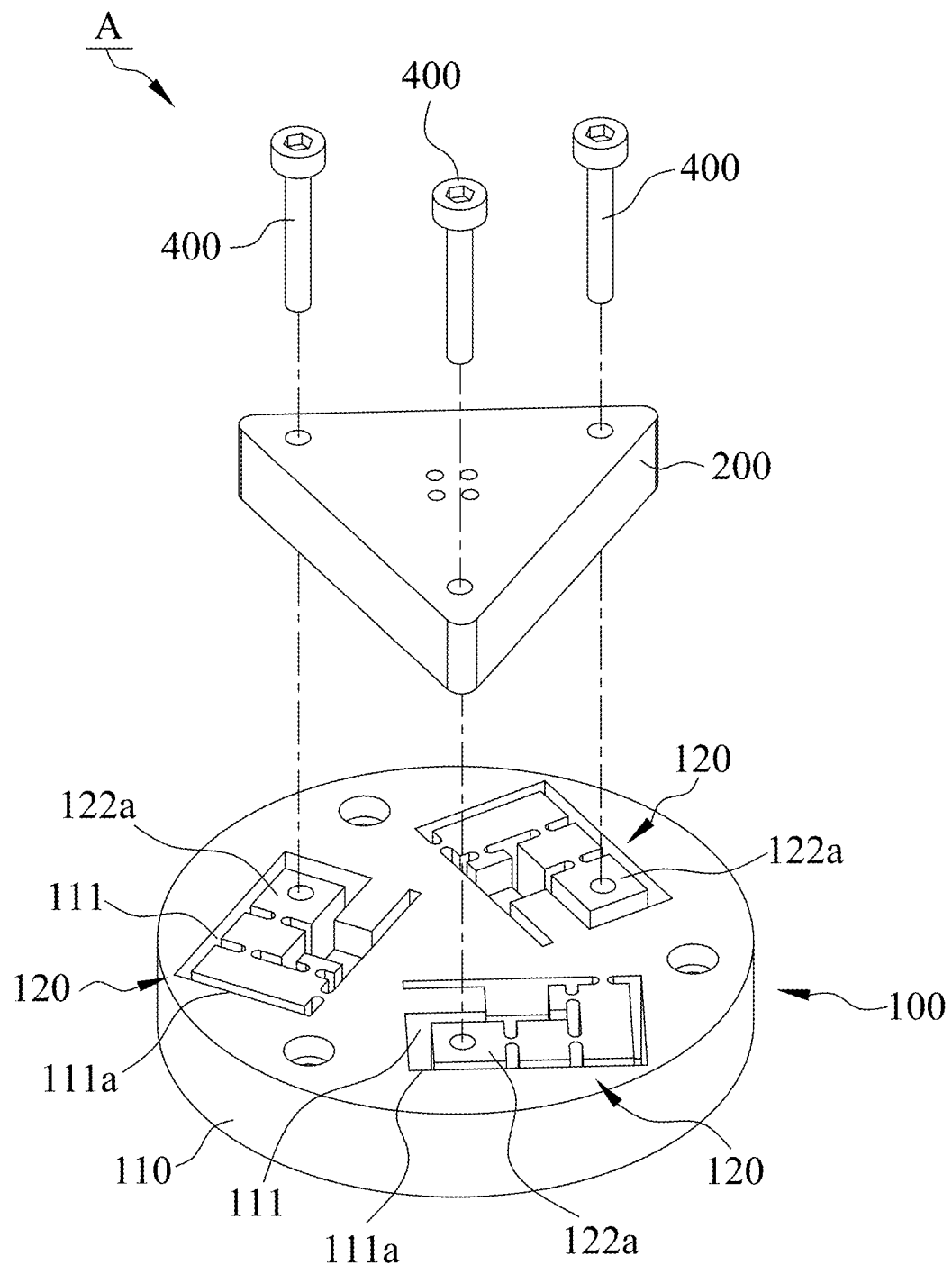
FIG. 2 is a perspective exploded diagram illustrating the force sensor in accordance with the preferred embodiment of the present invention.
Figure 3:
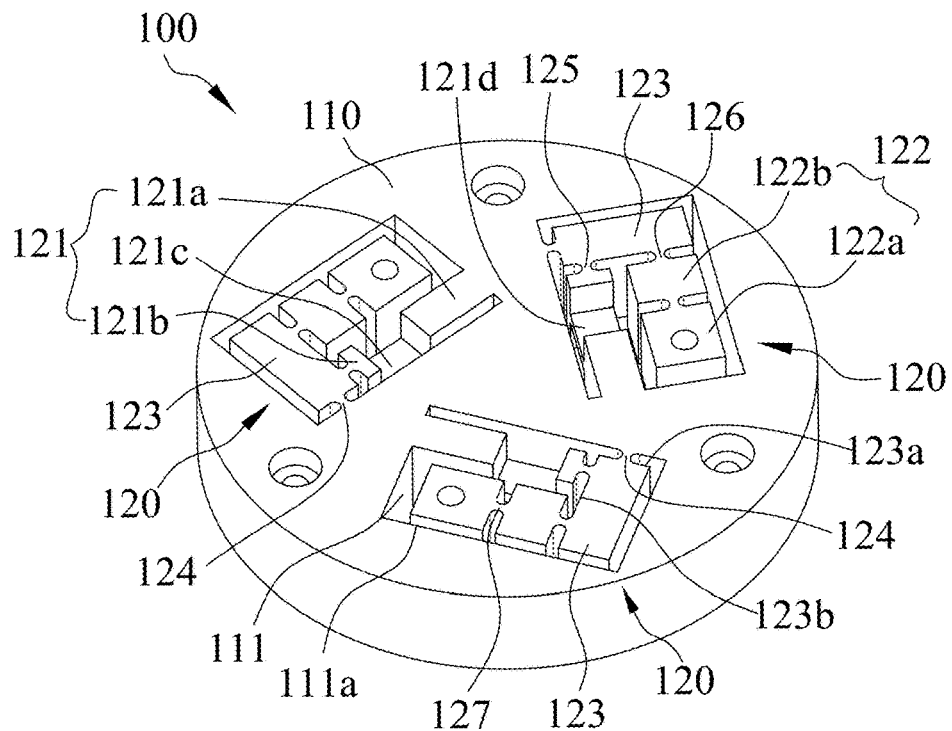
FIG. 3 is a front view diagram illustrating a sensing element in accordance with a preferred embodiment of the present invention.

With reference to FIGS. 1 and 2, a force sensor A in accordance with a preferred embodiment of the present invention includes a sensing element 100, a forced element 200 and strain gauges 300. The strain gauges 300 are mounted in the sensing element 100 and the forced element 200 is mounted on the sensing element 100. While the force sensor A is fixed on a measurement platform and a force is applied to the sensing element 100 via the forced element 200, the sensing element 100 has a deformation in a particular direction and electrical resistance of each of the strain gauges 300 is varied with the deformation of the sensing element 100.

With reference to FIGS. 3 to 6, the sensing element 100 includes a body 110 and flexure mechanisms 120. The flexure mechanisms 120 are located in accommodation spaces 111 of the body 110 and exposed from openings 111a of the accommodation spaces 111, respectively. Preferably, the flexure mechanisms 120 are integrally formed with the body 110, and distances from a central point of the body 110 to the same position at the different flexure mechanisms 120 are equal to each other. There are three flexure mechanisms 120 in the sensing element 100 of the preferred embodiment. However, in other embodiments, there may be two or more than three flexure mechanisms 120 in the body 110.

With reference to FIGS. 3 to 6, each of the flexure mechanisms 120 includes a first block 121, a second block 122, a third block 123, a first flexure hinge 124 and a second flexure hinge 125. The first flexure hinge 124 is located between the body 110 and the third block 123, and the second flexure hinge 125 is located between the first block 121 and the third block 123. The first flexure hinge 124 is connected to the body 110 and a first lateral surface 123a of the third block 123, the second flexure hinge 125 is connected to the first block 121 and a second lateral surface 123b of the third block 123, and the second block 122 is connected to the second lateral surface 123b of the third block 123. The first lateral surface 123a and the second lateral surface 123b are different surfaces on the third block 123, accordingly, the first block 121 and the second block 122 are located at the same side of the third block 123, and the first flexure hinge 124 is located at another side of the third block 123. Preferably, the third block 123 is a rectangular block, the first lateral surface 123a and the second lateral surface 123b are connected to and perpendicular to each other.

Preferably, the first flexure hinge 124 has a narrower width than the third block 123, and the second flexure hinge 125 has a narrower width than the first block 121. Furthermore, the first block 121, the second block 122 and the third block 123 in the accommodation space 111 are arranged in U-shaped and the first two are parallel with each other. However, the arrangement shape of the three blocks in the accommodation space 111 is not limited in particular, it can be any shape.

With reference to FIGS. 3 to 7, the first block 121 includes a fixed end 121a, a first connection end 121b and an elastic portion 121c that are integrally formed. The fixed end 121a is connected to the body 110. The first connection end 121b is close to the first lateral surface 123a of the third block 123 and connected to the second lateral surface 123b of the third block 123 via the second flexure hinge 125. In other words, the second flexure hinge 125 is located between the first connection end 121b and the third block 123 for the connection of the first connection end 121b to the second lateral surface 123b of the third block 123. The elastic portion 121c is located between and connected to the fixed end 121a and the first connection end 121b by its both ends.

The shortest distance between a top surface 121d and a bottom surface 121e is defined as the thickness of the elastic portion 121c, and in this preferred embodiment, the top surface 121d faces toward the forced element 200 and the bottom surface 121e is opposite to the top surface 121d. Preferably, the thickness of the elastic portion 121c is less than or equal to that of the fixed end 121a and the first connection end 121b, and is also less than its width.

Figure 5:
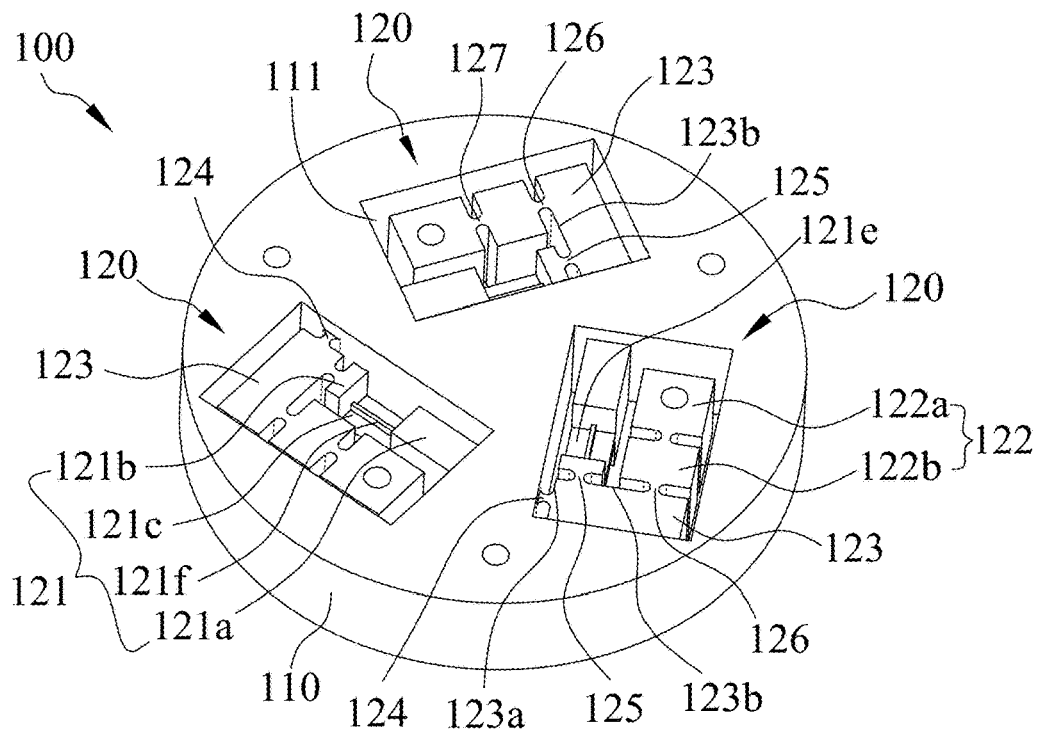
FIG. 5 is a back view diagram illustrating the sensing element in accordance with the preferred embodiment of the present invention.
Figure 6:
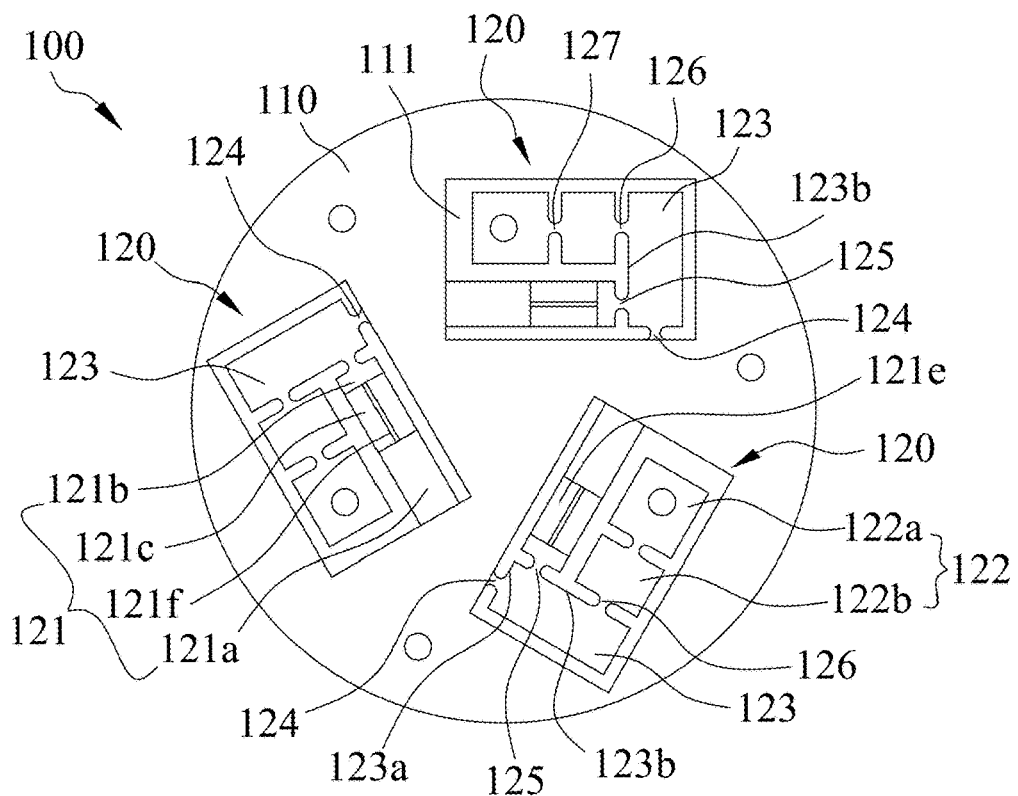
FIG. 6 is a top view diagram of FIG. 5.
Figure 7:
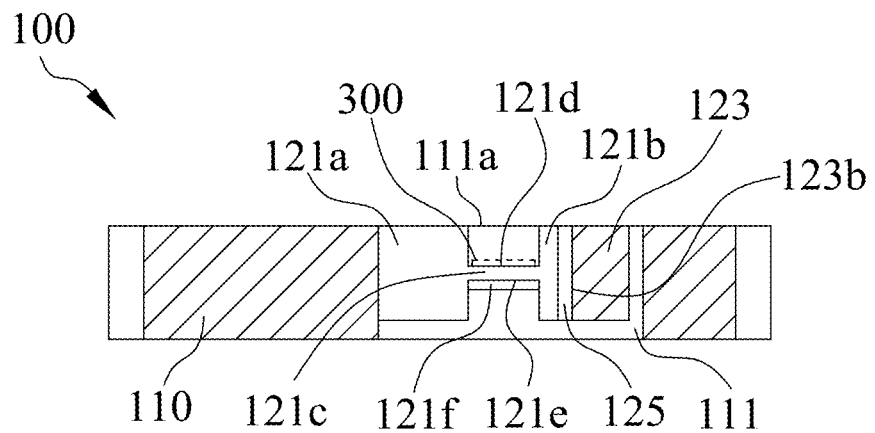
FIG. 7 is a cross-section view diagram of FIG. 4 taken along line A-A.

With reference to FIGS. 5 to 7, the first block 121 further includes a support portion 121f in this preferred embodiment. The support portion 121f is integrally formed on the elastic portion 121c and protruded from the bottom surface 121e of the elastic portion 121c. Both ends of the support portion 121f are connected to the fixed end 121a and the first connection end 121b, respectively, for supporting the elastic portion 121c. Consequently, when a vertical force (z-axis force) is applied to the top surface 121d, the support portion 121f can improve the ability to resist vertical deformation of the elastic portion 121c so as to improve the reliability of strain measurement.

With reference to FIGS. 2 to 6, the second block 122 has a free end 122a and a second connection end 122b. The second connection end 122b is connected to the second lateral surface 123b of the third block 123 to allow the free end 122a to be suspended in the accommodation space 111. The forced element 200 is coupled to the free end 122a of each of the flexure mechanisms 120 such that the free end 122a suspended in the accommodation space 111 is able to move with the forced element 200 while a force is applied to the forced element 200 and transmitted from the forced element 200 to the free end 122a. In this preferred embodiment, the force sensor A further includes coupling elements 400, and there are coupling holes on the sensing element 100 and the forced element 200. The coupling holes of the sensing element 100 are located at the free end 122a of each of flexure mechanisms 120, and the coupling elements 400 are inserted in the coupling holes of the forced element 200 and the free end 122a to couple them.

Figure 4:
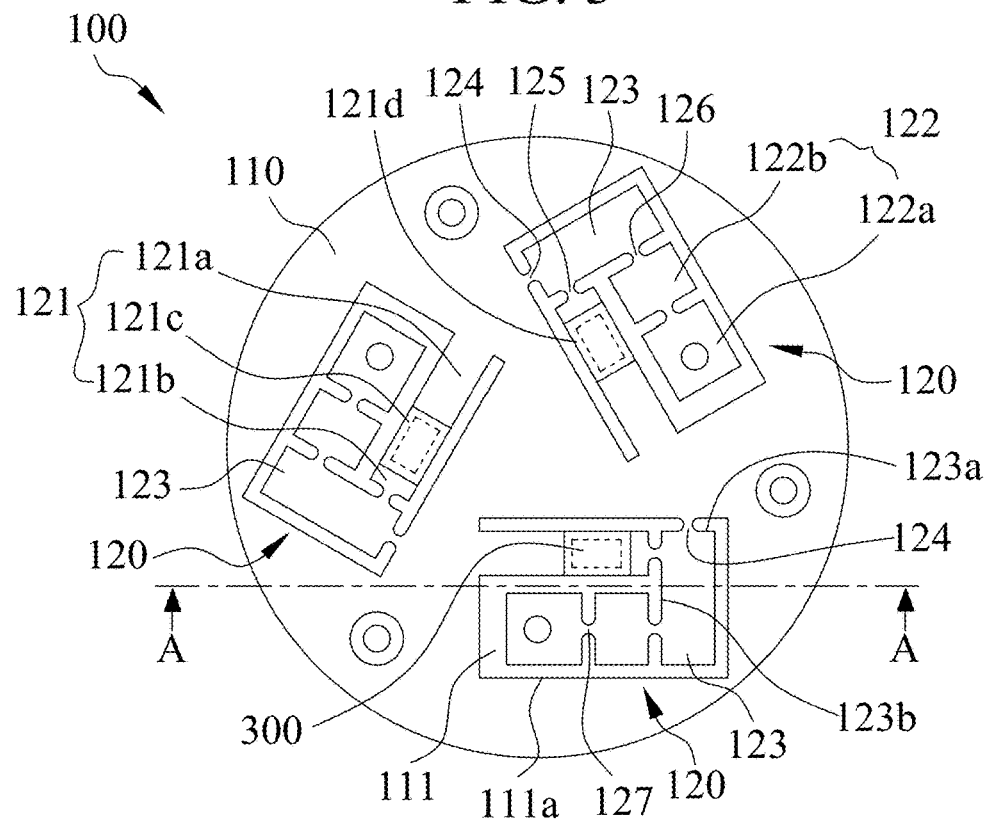
FIG. 4 is a top view diagram of FIG. 3.
Figure 8:
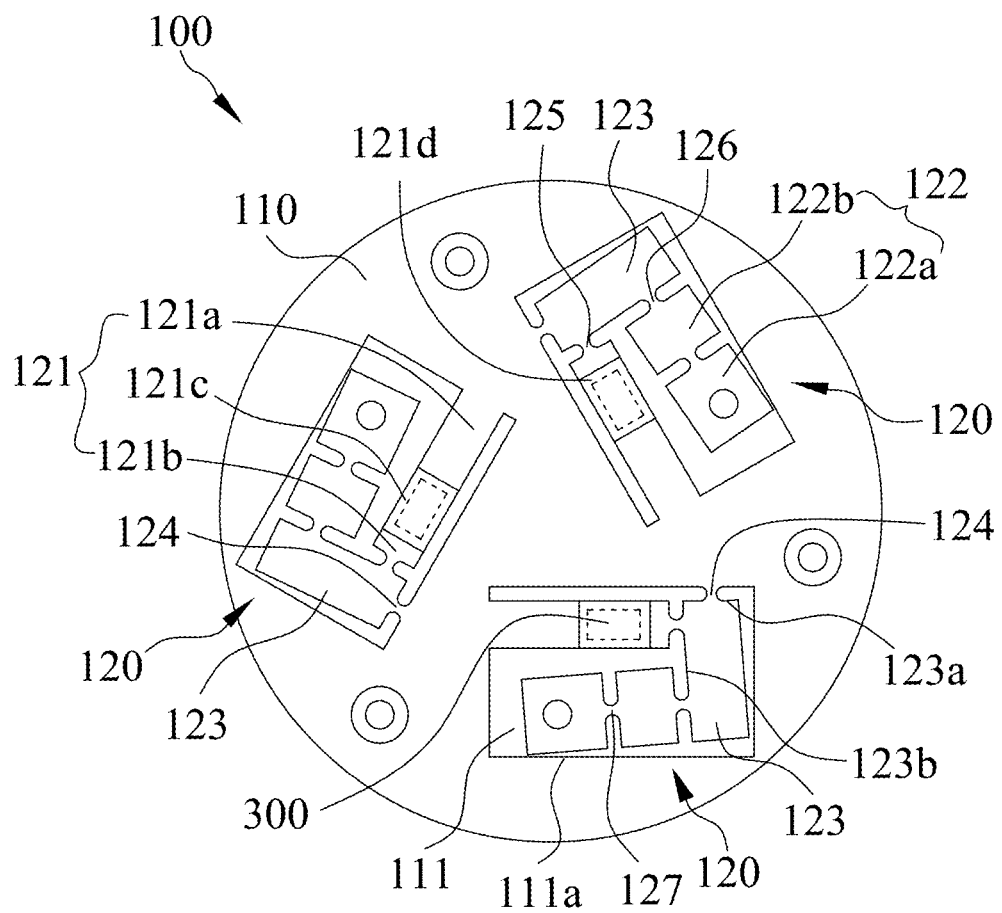
FIG. 8 is a top view diagram illustrating the forced sensing element in accordance with the preferred embodiment of the present invention.

With reference to FIGS. 4, 7 and 8, the first flexure hinge 124 and the second flexure hinge 125 are rotary joints that enable the second block 122 and the third block 123 to rotate with the forced element 200 when a force, such as torque, is applied to the forced element 200 and transmitted from the forced element 200 to the free end 122a. The first block 121 is not rotatable because of its fixed end 121a connected to the body 110. The force transmitted to the elastic portion 121c of the first block 121 via the first flexure hinge 124 and the second flexure hinge 125 is transformed into a single axis force in xy plane to cause an elastic deformation of the elastic portion 121c. Consequently, each of the strain gauges 300 is placed on the top surface 121d or the bottom surface 121e of the elastic portion 121c and provided to sense the elastic strain of the elastic portion 121c caused by the single axis force, particularly the tensile strain. In the preferred embodiment, each of the strain gauges 300 is stuck on the top surface 121d of the elastic portion 121c. However, there may be more than one strain gauges placed on the elastic portion 121c of each of the flexure mechanisms 120 in other embodiment, one is stuck on the top surface 121d and another one is stuck on the bottom surface 121e.

The force-deformation relation can be determined by the Jacobian matrix as follows, $$\begin{bmatrix} \Delta L_1 \\ \Delta L_2 \\ \Delta L_3 \end{bmatrix} = \begin{bmatrix} c_{11} & c_{12} & c_{13} \\ c_{21} & c_{22} & c_{23} \\ c_{31} & c_{22} & c_{33} \end{bmatrix} \begin{bmatrix} F_x \\ F_y \\ T_z \end{bmatrix}$$

where $\Delta L_1$, $\Delta L_2$ and $\Delta L_3$ are the tensile deformations of the elastic portions 121c of the three flexure mechanisms 120, respectively, each of them are the length difference (L'−L=ΔL) between the deformed elastic portion 121c and the undeformed elastic portion 121c, $c_{11}$, $c_{12}$ ... and $c_{33}$ denote constant terms estimated from stiffness and size of the sensing element 100, $F_x$, $F_y$ and $T_z$ are x-axis, y-axis and z-axis forces, respectively. Accordingly, the force sensor A of the present invention can be used to measure xyz-axis force, xy-axis force or z-axis torque.

With reference to FIGS. 4 and 7, owing to the force transmitted to the elastic portion 121c is converted into a single axis force in xy plane, the force variation can be detected by the strain gauges 300 that are each stuck on the top surface 121d or the bottom surface 121e of the elastic portion 121c. In the preferred embodiment, before mounting the forced element 200 on the sensing element 100, each of the strain gauges 300 can be precisely stuck on the top surface 121d exposed by the opening 111a of the accommodation space 111 for higher sensitivity.

As shown in FIGS. 3 to 6, each of the flexure mechanisms 120 further includes a third flexure hinge 126 and a fourth flexure hinge 127 in the preferred embodiment. The third flexure hinge 126 is located between the second connection end 122b and the third block 123 and connected to the second connection end 122b and the second lateral surface 123b of the third block 123 by its both ends respectively, namely that the second connection end 122b is connected to the third block 123 via the third flexure hinge 126. The fourth flexure hinge 127 is located between and connected to the free end 122a and the second connection end 122b, that is to say the free end 122a is connected to the second connection end 122b through the fourth flexure hinge 127. Additionally, the third flexure hinge 126 has a narrower width than the second connection end 122b, and the fourth flexure hinge 127 has a narrower width than the free end 122a and the second connection end 122b.

The third flexure hinge 126 and the fourth flexure hinge 127 are used as rotary joints and also provided to improve the flexibility of each of the flexure mechanisms 120. However, the number of the flexure hinges is determined by requirements of stiffness and size of the flexure mechanism 120, not resisted in the present invention. The flexure mechanism 120 of the present invention may further include the third flexure hinge 126, the fourth flexure hinge 127 or other flexure hinges.

While this invention has been particularly illustrated and described in detail with respect to the preferred embodiments thereof, it will be clearly understood by those skilled in the art that is not limited to the specific features shown and described and various modified and changed in form and details may be made without departing from the spirit and scope of this invention.

What is claimed is:

1. A force sensor, comprising:
   a sensing element including a body and a plurality of flexure mechanisms, the flexure mechanisms are located in a plurality of accommodation spaces of the body and exposed by a plurality of openings of the accommodation spaces respectively, each of the flexure mechanisms includes a first flexure hinge, a second flexure hinge, a first block, a second block and a third block, the body is connected to a first lateral surface of the third block via the first flexure hinge, the first block includes a fixed end, a first connection end and an elastic portion, the fixed end is connected to the body, the first connection end is connected to a second lateral surface of the third block via the second flexure hinge, and both ends of the elastic portion are connected to the fixed end and the first connection end respectively, the second block includes a free end and a second connection end, the second connection end is connected to the second lateral surface of the third block such that the free end is suspended in the accommodation space;
   a forced element placed on the sensing element and coupled to the free end of the second block; and
   a plurality of strain gauges each placed on the elastic portion of each of the flexure mechanisms, wherein each of the strain gauges is configured to sense an elastic strain of the elastic portion when a force is applied to the forced element, transmitted to the free end via the forced element and transmitted to the elastic portion via the first and second flexure hinges.

2. The force sensor in accordance with claim 1, wherein each of the flexure mechanisms further includes a third flexure hinge that is located between and connected to the second connection end of the second block and the third block.

3. The force sensor in accordance with claim 1, wherein each of the flexure mechanisms further includes a fourth flexure hinge that is located between and connected to the free end and the second connection end of the second block.

4. The force sensor in accordance with claim 1, wherein the first and second lateral surfaces of the third block are connected to one another, and the first lateral surface is close to the first connection end of the first block.

5. The force sensor in accordance with claim 1, wherein each of the strain gauges is placed on a top surface of the elastic portion, the top surface faces toward the forced element.

6. The force sensor in accordance with claim 1, wherein each of the strain gauges is placed on a bottom surface of the elastic portion.

7. The force sensor in accordance with claim 1, wherein the first block further includes a support portion that is protruded from a bottom surface of the elastic portion, both ends of the support portion are connected to the fixed end and the first connection end respectively.

8. The force sensor in accordance with claim 1, wherein a thickness of the elastic portion is less than or equal to a thickness of the fixed end.

9. The force sensor in accordance with claim 1, wherein a thickness of the elastic portion is less than a width of the elastic portion.

10. The force sensor in accordance with claim 1, wherein distances from a central point of the body to each of the flexure mechanisms are equal to each other.

11. The force sensor in accordance with claim 1 further comprising a plurality of coupling elements, wherein each of the coupling elements is placed in the forced element and the free end of the second block.

12. A sensing element of force sensor, comprising:
    a body; and
    a plurality of flexure mechanisms located in a plurality of accommodation spaces of the body and exposed by a plurality of openings of the accommodation spaces respectively, each of the flexure mechanisms includes a first flexure hinge, a second flexure hinge, a first block, a second block and a third block, the body is connected to a first lateral surface of the third block via the first flexure hinge, the first block includes a fixed end, a first connection end and an elastic portion, the fixed end is connected to the body, the first connection end is connected to a second lateral surface of the third block via the second flexure hinge, and both ends of the elastic portion are connected to the fixed end and the first connection end respectively, the second block includes a free end and a second connection end, the second connection end is connected to the second lateral surface of the third block such that the free end is suspended in the accommodation space.

13. The sensing element in accordance with claim 12, wherein each of the flexure mechanisms further includes a third flexure hinge that is located between and connected to the second connection end of the second block and the third block.

14. The sensing element in accordance with claim 13, wherein each of the flexure mechanisms further includes a fourth flexure hinge that is located between and connected to the free end and the second connection end of the second block.

15. The sensing element in accordance with claim 12, wherein each of the flexure mechanisms further includes a fourth flexure hinge that is located between and connected to the free end and the second connection end of the second block.

16. The sensing element in accordance with claim 12, wherein the first and second lateral surfaces of the third block are connected to one another, and the first lateral surface is close to the first connection end of the first block.

17. The sensing element in accordance with claim 12, wherein the first block further includes a support portion that is protruded from a bottom surface of the elastic portion, both ends of the support portion are connected to the fixed end and the first connection end respectively.

18. The sensing element in accordance with claim 12, wherein a thickness of the elastic portion is less than or equal to a thickness of the fixed end.

19. The sensing element in accordance with claim 12, wherein a thickness of the elastic portion is less than a width of the elastic portion.

20. The sensing element in accordance with claim 12, wherein distances from a central point of the body to each of the flexure mechanisms are equal to each other.

\* \* \* \* \*